United States Patent [19]

Karadsheh et al.

[11] 4,366,531

[45] Dec. 28, 1982

[54] PHASE CONTROL FOR A MULTIPLE PHASE SCR CHOPPER

[75] Inventors: Sam M. Karadsheh, Troy; Thomas A. Radomski, Utica, both of Mich.

[73] Assignee: General Motors Corporation, Detroit, Mich.

[21] Appl. No.: 292,250

[22] Filed: Aug. 12, 1981

Related U.S. Application Data

[63] Continuation-in-part of Ser. No. 188,150, Sep. 17, 1980.

[51] Int. Cl.$^3$ ............................................ H02M 3/135
[52] U.S. Cl. ....................................... 363/57; 318/139; 318/345 G; 363/124
[58] Field of Search ................... 363/57, 100, 124, 71, 363/135, 72, 136; 318/139, 341, 345 C, 345 G; 323/272

[56] References Cited

U.S. PATENT DOCUMENTS

| | | | |
|---|---|---|---|
| 3,351,841 | 11/1967 | Lipman et al. | 363/136 |
| 3,944,856 | 3/1976 | Horie | 363/124 |
| 3,958,173 | 5/1976 | Christianson et al. | 363/124 |
| 4,090,115 | 5/1978 | Franz | 318/341 |
| 4,161,010 | 7/1979 | Mann et al. | 361/79 |
| 4,284,938 | 8/1981 | Bailey | 318/345 G |

Primary Examiner—William H. Beha, Jr.
Attorney, Agent, or Firm—Mark A. Navarre

[57] ABSTRACT

A multiple phase SCR chopper controller for establishing a normal phase relationship among the various SCR phases and for modifying the normal phase relationship for input signals for which the SCR commutation networks cannot be sufficiently charged. These input signals correspond to conduction period overlap, and the modified phase relationship avoids chopper commutation failure under such conditions.

8 Claims, 14 Drawing Figures

SUMMARY OF OPERATION FOR 3 PHASE CHOPPER

| DC % | A ° | B ° | C ° |
|---|---|---|---|
| 0 – 23.3 | 0 | 120 | 240 |
| 23.3 – 33.3 | 0 | 84 | 168 |
| 33.3 – 56.7 | 0 | 120 | 240 |
| 56.7 – 66.7 | 0 | 84 | 168 |
| 66.7 – 100 | 0 | 120 | 240 |

PHASE CONTROL FOR A MULTIPLE PHASE SCR CHOPPER

This application is a Continuation-In-Part of copending application U.S. Ser. No. 188,150, Phase Control for a Multiple Phase SCR Chopper, filed on Sept. 17, 1980.

This invention relates to DC chopper control circuits and more particularly to a controller for reliably commutating a multiple phase silicon-controlled-rectifier (SCR) chopper.

SCR choppers have been used to control the application of power from a source of direct voltage such as a storage battery to an electrical load such as a vehicular traction motor. For such applications it is necessary to provide a commutation network for terminating the conduction of the SCR. The commutation network is "charged" by the source when the SCR is nonconductive and the stored energy is used at the end of a conduction period to reverse bias the SCR, rendering it nonconductive. In such a system, the chopping frequency and the duration of the conduction period are adjusted to control the average power delivered to the load.

Generally, higher chopping frequencies reduce motor ripple current and motor frame losses. However, the time required for commutation of the SCR effectively limits the chopping frequency to approximately 1 kHz. By connecting two or more SCR choppers in parallel between the source and the load to form a multiple phase chopper, the chopping frequency of the system is effectively increased even though the chopping frequency of each SCR remains the same. Furthermore, a multiple phase chopper offers better battery current form factor than can be obtained with a single phase chopper. The term "form factor" as used above is a quantitative measurement and is defined as the ratio of the average battery current to the rms (root-mean-square) battery current. With a multiple phase chopper system, the SCR's are individually biased on and off by a control unit responsive to a load demand signal. The various SCR's are biased to their conductive states according to a predetermined phase relationship and the control unit varies the conduction period to satisfy the load demand. The phase relationship among the phases is important since it effects the battery current ripple content, and thus the battery current form factor.

Commutation failures have been observed in multiple phase choppers when the duty cycle of the chopper is increased to the point where the termination of one phase conduction period approaches the commencement of another phase conduction period. This condition is hereinafter referred to as conduction period crossover. It has been determined that the commutation failures in the vicinity of conduction period crossover are due to the limiting action of battery inductance on battery current. That is, the inherent inductance of the battery limits the ability of the battery to instantaneously supply power to both the oncoming phase SCR and the offgoing phase commutation network. As a result, the oncoming phase SCR diverts the limited battery current away from the offgoing phase commutation network so that the network is not sufficiently charged and fails to commutate on the following conduction period. This condition is obviously undesirable and results in excessive load current which if not properly limited could damage or destroy further system components.

Conventional solutions to commutation failures are network hardware oriented and therefore increase the size, weight and complexity of the commutation networks.

Accordingly, it is an object of this invention to provide an improved controller for a DC multiple phase SCR chopper wherein reliable commutation is achieved over an entire range of chopper duty-cycles without increasing the size, complexity, or cost of the commutation networks.

It is a further object of this invention to provide an improved controller for a DC multiple phase SCR chopper wherein the phase relationship among the various SCR phases is controlled in a manner to prevent commutation failure due to inadequate charging of the commutation networks.

It is a further object of this invention to provide an improved controller for a DC multiple phase SCR chopper wherein the phase relationship between the SCR phases is normally maintained at a value resulting in most efficient operation, and wherein the phase relationship is modified over a predetermined range of load conditions to prevent an oncoming phase SCR from limiting the commutating capability of an offgoing phase commutation network.

It is a further object of this invention to provide an improved multiple phase chopper mechanism to energize a direct current motor which advantageously operates in two modes, the first mode being time balanced to provide the most efficient and favorable motor energization and the second mode being unbalanced, one phase being master and the other phase or phases being time unbalanced to the extent required to avoid turn-on of any phase during the commutation period of another phase.

These objects are carried forward with a DC multiple phase SCR chopper by controlling the phase relationship of the conduction periods in a manner to avoid chopper operation in the vicinity of conduction period crossover. The phase relationship among the SCR's is normally set at a value providing minimum battery ripple current content and load loss. The conduction periods for each of the phases are equal in duration and determined as a function of a load demand input signal. When the input signal is in a range that would result in the termination of one-phase conduction period within a predetermined time duration preceding the commencement of another phase conduction period, the phase relationship between the conduction periods is modified to avoid the above mentioned condition, enabling reliable commutation at the power level requested by the input signal. The predetermined time duration referred to above corresponds to the time required to charge the chopper commutation networks. When the input signal changes so that the conduction periods corresponding therewith would not result in insufficient charging of the commutation networks at normal phase relationship, the chopper phase relationship is returned to the normal value. As a result, the chopper functions at its most efficient phase relationship except under input signal levels that tend to result in commutation failure. Under such conditions, the phase relationship is temporarily modified to obviate the commutation failure.

IN THE DRAWINGS

FIGS. 3A and 3B are timing diagrams illustrating the operation of the chopper shown in FIG. 1 at a load point approaching conduction period crossover. FIG. 3A illustrates conventional chopper control with timing pulses in the commutation failure region, and FIG. 3B illustrates how the chopper control circuit of this invention avoids commutation failure by modifying the SCR phase relationship.

Figure 1:
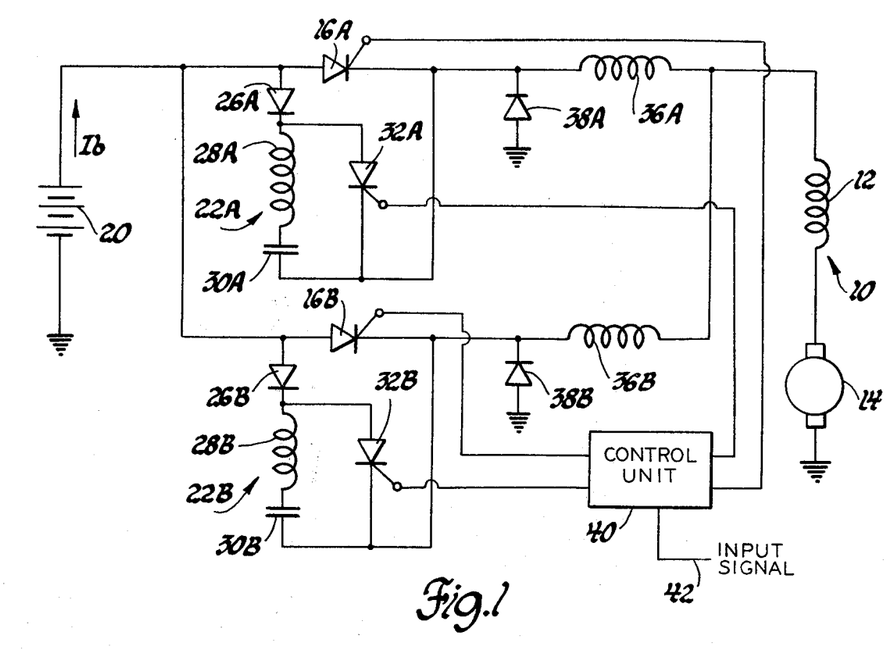
FIG. 1 is a schematic illustration of a two-phase SCR chopper and the control unit of this invention.

Referring now to FIG. 1, reference numeral 10 generally designates a vehicular traction motor comprising a series field winding 12 and an armature winding 14. This invention is of course applicable to other types of motors as well but a series field motor is shown for simplicity. SCR's 16A and 16B comprise a two-phase ($2\phi$) chopper, SCR 16A defining Phase A and SCR 16B defining Phase B. Accordingly, each circuit element associated with Phase A or Phase B is identified by the appropriate alphameric subscript. SCR's 16A and 16B are each selectively actuated to conduct current from storage battery 20 to traction motor 10 and each has a commutation network 22A, 22B associated therewith for commutating the respective SCR to terminate a conduction period. Commutation networks 22A and 22B are identical and include a diode 26A or 26B, an inductor 28A or 28B, a capacitor 30A or 30B, and an SCR 32A or 32B. When the respective phase SCR 16A or 16B is in its nonconductive state, the capacitor 30A or 30B is charged or "rung-up" through diode 26A or 26B, inductor 28A or 28B, and traction motor 10 to a voltage approximately equal to the terminal voltage of battery 20. The diode 26A or 26B prevents the capacitor 30A or 30B from discharging back into battery 20. When in this condition the commutation network 22A or 22B is said to be "charged". Once the phase SCR 16A or 16B is conductive and it is desired to terminate such conduction, the respective SCR 32A or 32B is rendered conductive and the charge on the capacitor 30A or 30B reverse biases the phase SCR 16A or 16B to terminate its conduction. The commutating SCR 32A or 32B does not need a separate commutation network as the network LC elements form a resonant circuit for natural commutation. Inductors 36A and 36B filter the current supplied to traction motor 10, and free-wheeling diodes 38A and 38B operate in a well-known manner to circulate the inductive energy stored in inductors 36A and 36B and traction motor windings 12 and 14 when SCR's 16A or 16B are biased to a nonconductive state.

Reference numeral 40 designates a control unit for developing control pulses for SCR's 16A, 16B, 32A and 32B in accordance with the value of an input signal on line 42. The input signal is preferably indicative of the desired power output of traction motor 10 and in an electric vehicle application, for example, may be developed as a function of the position of an accelerator pedal.

Figure 2:
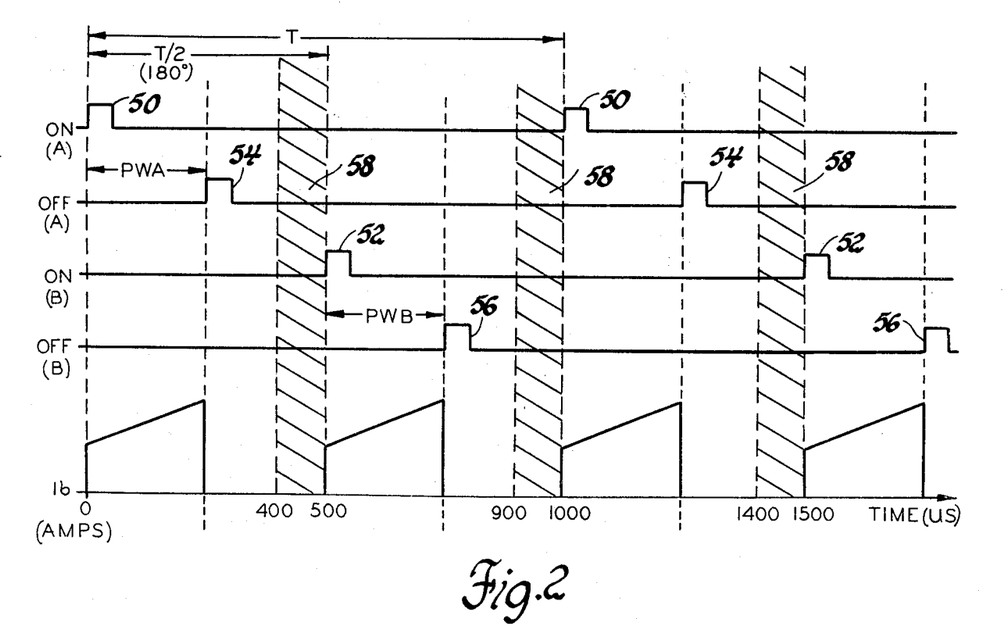
FIG. 2 is a timing diagram illustrating normal operation of the chopper illustrated in FIG. 1.

FIG. 2 illustrates typical control pulses developed by control unit 40 and the resulting battery current (Ib) applied to traction motor 10. The pulses shown on the trace designated "ON (A)" are applied to the gate terminal of SCR 16A to initiate a Phase A conduction period, and the pulses shown on the trace designated "ON (B)" are applied to the gate terminal of SCR 16B to initiate a Phase B conduction period. Similarly, the pulses shown on the trace designated "OFF (A)", are applied to the gate terminal of SCR 32A to terminate a Phase A conduction period, and the pulses shown on the trace designated "OFF (B)" are applied to the gate terminal of SCR 32B to terminate a Phase B conduction period. The chopping frequency (1/T) for each phase SCR 16A and 16B is shown constant at 1 kHz, and the phase relationship between the turn-on pulses for Phase A (designated by reference numeral 50) and the turn-on pulses for Phase B (designated by reference numeral 52) is maintained at 180°. Thus, if the chopping period T is 1,000 microseconds, a turn-on pulse will be applied to SCR 16B 500 microseconds following the application of a turn-on pulse to SCR 16A. The turn-off pulses 54 and 56 for SCR's 32A and 32B are developed so that the conduction period of Phase A (PWA) is equal in duration to the conduction period of Phase B (PWB). The shaded region 58 preceding each turn-on pulse 50 or 52 represents a forbidden zone for a turn-off pulse 54 or 56. The width of the shaded regions 58 are equal in duration and correspond to the time required to charge the commutation networks 22A and 22B. It will be appreciated that this time may be calculated as a function of the SCR load current, the type of commutation network, and the circuit element values contained therein. For the commutation networks illustrated in FIG. 1 wherein inductors 28A and 28B are 6 uH and wherein capacitors 30A and 30B are 20 uF, the time required for adequate charging is approximately 100 microseconds. Accordingly, each shaded region 58 is 100 microseconds wide, and a commutation failure will occur if an off-pulse 54 or 56 occurs therein. For the load point illustrated in FIG. 2, however, the off-pulses 54 and 56 are not within the shaded regions 58 and the phase SCR's 16A and 16B are commutated successfully as may be seen in the trace of battery current Ib vs. time.

Figure 3A:
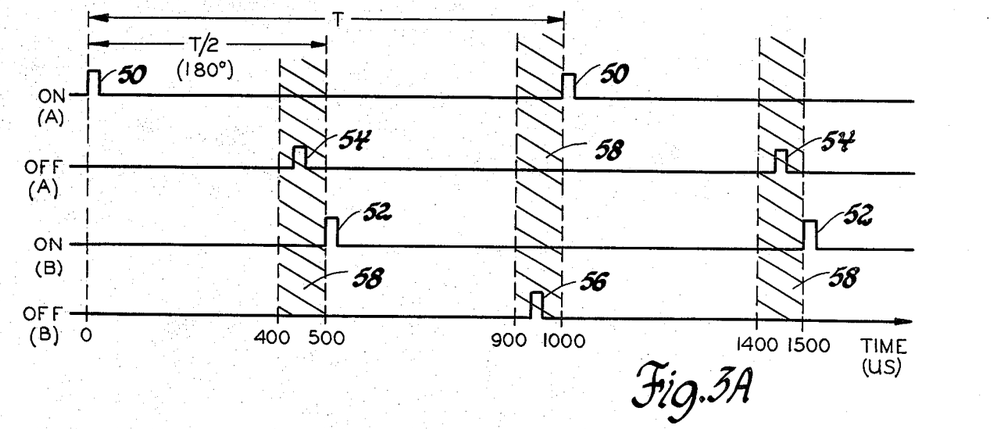
Figure 3B:
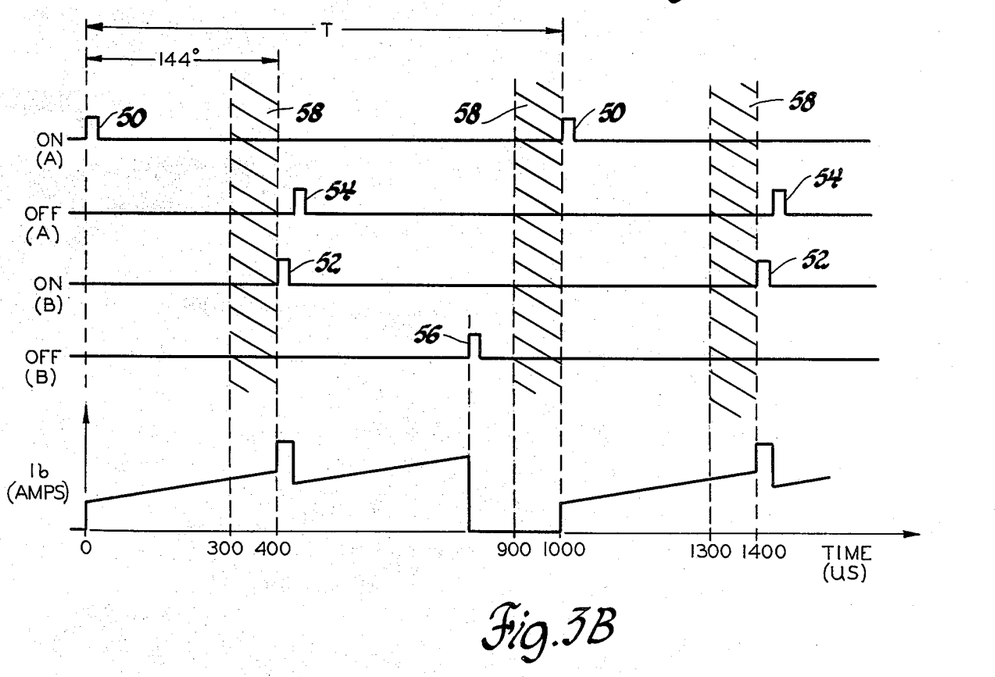

FIGS. 3A and 3B illustrate chopper operation at phase conduction periods which, at 180° phase separation, results in the occurrence of an off-pulse 54 or 56 in a shaded region 58. FIG. 3A illustrates the control pulses if the phase separation between Phases A and B is maintained at 180°, while FIG. 3B illustrates the control pulses developed according to the control unit of this invention. Battery current is not shown for FIG. 3A since the attendant commutation failures would result (if not limited) in an infinite battery current. As may be seen in FIG. 3B, this invention recognizes that the commutation failures at the illustrated load point may be prevented by modifying the phase relationship between Phase A and Phase B so that a turn-off pulse 54 or 56 does not occur within a shaded region 58. The conduction period of Phase B remains the same but the turn-on pulse 52 for Phase B occurs 100 microseconds earlier than would otherwise occur for a phase separation of 180°. If the chopping frequency is 1 kHz, the modified phase relationship between Phase A and Phase B is 144°—100 microseconds occupies 36°. Obviously, the phase relationship could be decreased further but such a decrease would needlessly increase battery current ripple content. The modified phase relationship is maintained until the input signal value changes sufficiently so that a turn-off pulse 54 or 56 would not occur in a shaded region 58 at 180° phase separation. Thus, as the input signal value increases from its minimum value to its maximum value, the phase relationship between Phase A and Phase B will at first be 180°. When the conduction period increases to 400 microseconds, the phase relationship is modified to 144°, and when the conduction period is increased to 500 microseconds, the phase relationship is restored to 180°. When the input signal decreases from its maximum value to its minimum value, the above described sequence occurs in reverse order.

It will be appreciated that since the conduction period of each phase is the same whether the chopper is operated at the normal phase relationship or the modified phase relationship, the average power delivered from battery 20 to traction motor 10 is the same. Thus, the torque response of motor 10 is continuous and smooth over the entire range of input signal values. It will be seen by reference to the bottom trace of FIG. 3B that the battery current ripple content is slightly increased during operation at 144° as compared to operation at 180°. However, the modified phase relationship is employed over only 10 percent of the range of chopper duty cycles (100 microseconds/1,000 microseconds), and as a result, the battery current ripple content is increased only marginally by the control system of this invention.

Figure 4:
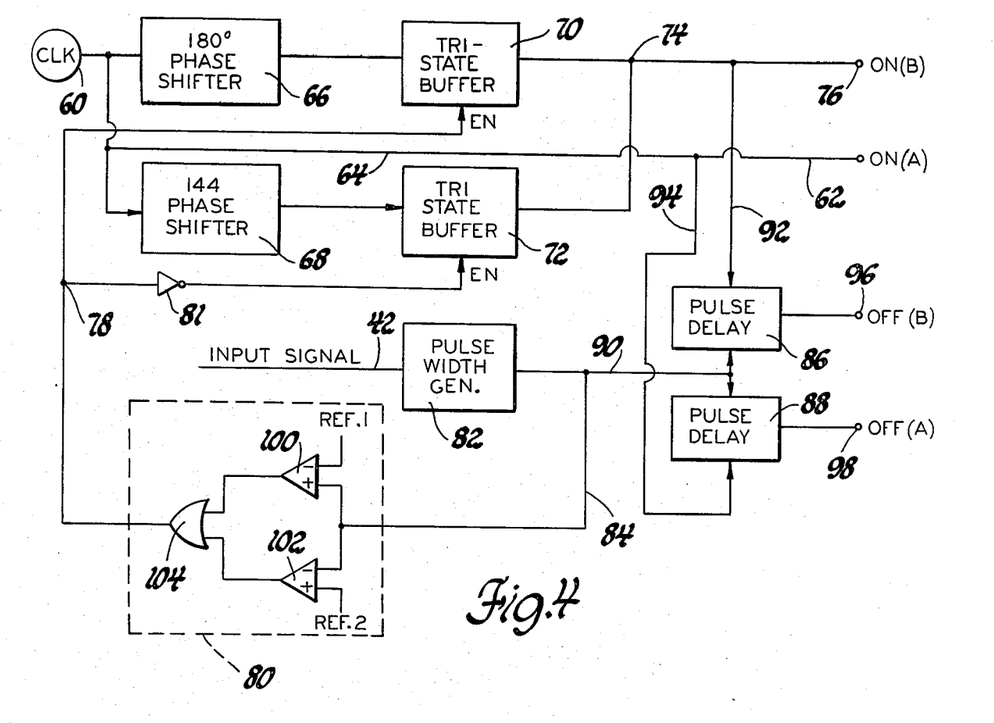
FIG. 4 is a block diagram for a control circuit implementation of the invention as applied to a two-phase chopper.

FIG. 4 is a block diagram of a control circuit for implementing the invention with a two-phase chopper. Reference numeral 60 designates a clock for producing a train of digital pulses at a frequency of 1 kHz. The ON (A) pulses are obtained directly from clock 60 and appear on output line 62. It will be appreciated, of course, that the clock pulses from clock 60 may be obtained from a higher frequency clock such as the main clock of a microprocessor by dividing its frequency down to 1,000 Hz. Clock pulses from clock 60 are applied as inputs to 180° phase shifter 66 and 144° phase shifter 68. Phase shifters 66 and 68 may, for example, be counters counting at the main microprocessor clock frequency and triggered on by clock 60. If the main clock frequency is 1 MHz, for example, phase shifter 66 outputs a pulse after counting 500 pulses—500 pulses from the main clock corresponds to 180° of the period of clock 60. Similarly, phase shifter 66 outputs a pulse after counting 400 clock pulses—400 clock pulses from the main clock corresponds to 144° of the period of clock 60. The output pulses of phase shifters 66 and 68 are applied as inputs to tristate buffers 70 and 72 respectively. The outputs of buffers 70 and 72 are connected together at terminal 74 which is connected to terminal 76 for applying ON (B) pulses to the chopper. As will be explained below, buffers 70 and 72 are alternately enabled to pass pulses from phase shifter 66 or 68 to terminal 76 for turning on Phase B.

Buffers 70 and 72 act as gates which when enabled pass a signal from input to output and when disabled present a high impedance or essentially open-circuited output. The buffers 70 and 72 are alternately enabled according with the voltage potential at terminal 78. If the voltage at terminal 78 is at a digital logic zero level, buffer 70 is disabled and buffer 72 is enabled through inverter 81 to pass 144° phase-shifted pulses from phase shifter 68 to output terminal 76. If the voltage level at terminal 78 is a digital logic one level, buffer 72 is disabled through inverter 81 and buffer 70 is enabled to pass 180° phase shifted pulses from phase shifter 66 to output terminal 76. The voltage at terminal 78 is generated by a window comparator 80, as will later be described.

An input signal which may be derived from a potentiometer responsive to the setting of an accelerator pedal is applied to pulse width generator 82 via line 42. Pulse width generator 82 is an electronic function generator responsive to the magnitude of an input signal for generating a digital output signal indicative of the pulse width for chopper phase conduction duration, determined according to a predetermined schedule.

The output of pulse width generator 82 is periodically applied as an input to pulse delay units 86 and 88 via line 90 in synchronism with the pulses from clock 60. Pulse delay unit 86 receives a second input from terminal 76 via line 92 and pulse delay unit 88 receives a second input from terminal 62 via line 94. Pulse delay units 86 and 88 may be counters which when activated by the ON pulse for Phase B and Phase A, respectively, decrement the pulse width number preset in their respective registers via line 90 at a predetermined clock rate, such as that of the main microprocessor clock. When the preset pulse width number is decremented to zero, circuits 86 and 88 operate to produce output pulses at terminals 96 and 98, respectively, for turning off Phase B and Phase A respectively. It will thus be seen that the conduction duration of Phase A and Phase B are equal and determined by the pulse width number generated on line 90 by pulse width generator 82.

The output of pulse width generator 82 is also applied as an input to window comparator 80. Specifically, the pulse width number is compared to a first reference value (REF 1) in comparator 100 and to a second reference value (REF 2) in comparator 102. The reference values are chosen to define the limits in time of a dead zone preceding the occurrence of a turn-on pulse for Phase B. The duration or width of the dead zone which is shown in FIGS. 2, 3A, and 3B as a shaded region, is approximately 100 microseconds (uS) for the circuit values used in the chopper illustrated in FIG. 1, and corresponds to the time required to sufficiently charge a commutation network 22A or 22B. Thus, if the normal phase separation is 180°, T is the period of the clock pulses from clock 60, and TC is the time required to charge a commutation network, REF 1=T/2, and REF 2=(T/2)−TC. For an embodiment wherein the chopping frequency is 1,000 Hz, and wherein the commutation network charging time is 100 uS, REF 1 is set to a value indicative of 500 uS and REF 2 is set to a value indicative of 400 uS. The outputs of comparators 100 and 102 are applied as inputs to OR gate 104, the output of which is connected to terminal 78 for controlling the enabling of tristate buffers 70 and 72 as described earlier. If the pulse width number on line 84 exceeds REF 1, the turn-off pulse for Phase A occurs after the deadband associated with the turn-on pulse for Phase B. In this case, the output of comparator 100 is a logic one and OR gate 104 generates a logic one voltage level on terminal 78 to disable buffer 72 and to enable buffer 70 for passing 180° phase-shifted pulses from phase shifter 66 to output terminal 76. If the pulse width number on line 84 is less than REF 2, the OFF pulse for Phase A precedes the dead zone associated with the turn-on pulse for Phase B. In this case, the output of comparator 102 assumes a logic one voltage level and OR gate 104 generates a digital logic one voltage level at terminal 78 for enabling buffer 70 as described above. If the pulse width number on line 84 falls between REF 1 and REF 2, the OFF pulse for Phase A occurs within the dead zone preceding the ON pulse for Phase B. For such cases, the commutation network 22A will not be adequately charged and a commutation failure on the following cycle will result. When such pulse widths occur, the output of comparators 100 and 102 are both at a logic zero voltage level so that OR gate 104 generates a logic zero voltage level at terminal 78. As explained before, this condition disables buffer 70 and enables buffer 72 to pass 144° phase-shifted pulses from phase shifter 68 to output terminal 76 so that the ON (B) pulses are developed at a 144° phase relationship with respect to the ON (A) pulses. This condition persists so long as the pulse width number on line 84 falls between REF 1 and REF 2. When the input signal on line 42 changes so that the pulse width number no longer falls between REF 1 and REF 2, buffer 72 is disabled and buffer 70 is enabled so that the phase relationship between Phases A and B reverts to 180°. Since the phase conduction periods are equal in duration, the occurrence of any OFF pulse within 100 uSec of an ON pulse may be detected by monitoring the phase conduction period.

The circuit implementation of control unit 40 depicted in FIG. 4 thus produces turn-on pulses like those depicted in FIGS. 2 and 3B. When the input signal applied over line 42 causes pulse-width generator 82 to produce an output signal outside of a deadband range defined by reference values REF 1 and REF 2, the turn-on and turn-off pulses at terminals 62, 76, 96 and 98 resemble those shown in FIG. 2—180° phase separation between Phases A and B. When the output of pulse width generator 82 lies between reference values REF 1 and REF 2, the turn-on and turn-off pulses resemble those depicted in FIG. 3B—144° phase separation between Phases A and B.

At low power levels, it may be desired to reduce the chopping frequency in order to avoid the generation of undesirably short conduction periods. For example, at input signal levels below some fixed level, a suitable gate mechanism (not shown) can be activated to half the frequency of clock 60. In such case, ON (A) pulses would occur at a rate of 500 Hz instead of 1,000 Hz and the conduction duration of both phases would be doubled as compared to operation at 1,000 Hz. Also, the values of REF 1 and REF 2 would have to be altered. The average power supplied to the motor under reduced clock frequency operation would, of course, be the same as at the standard clock frequency for a given input signal. Alternately, in place of the control circuitry depicted in FIG. 4, the invention may be implemented with a programmed microprocessor such as, for example, the MC 6800 and the various 6800-series support circuits manufactured by Motorola Semiconductor Products, Inc. These semiconductor devices are more fully described in the M6800 Microprocessor Application Manual, published by Motorola. The capability of providing reduced motor pulse frequency as previously described is readily incorporated within a programmed microprocessor implementation, and a suitable flow diagram representing the general program steps is depicted in FIG. 5.

Figure 5:
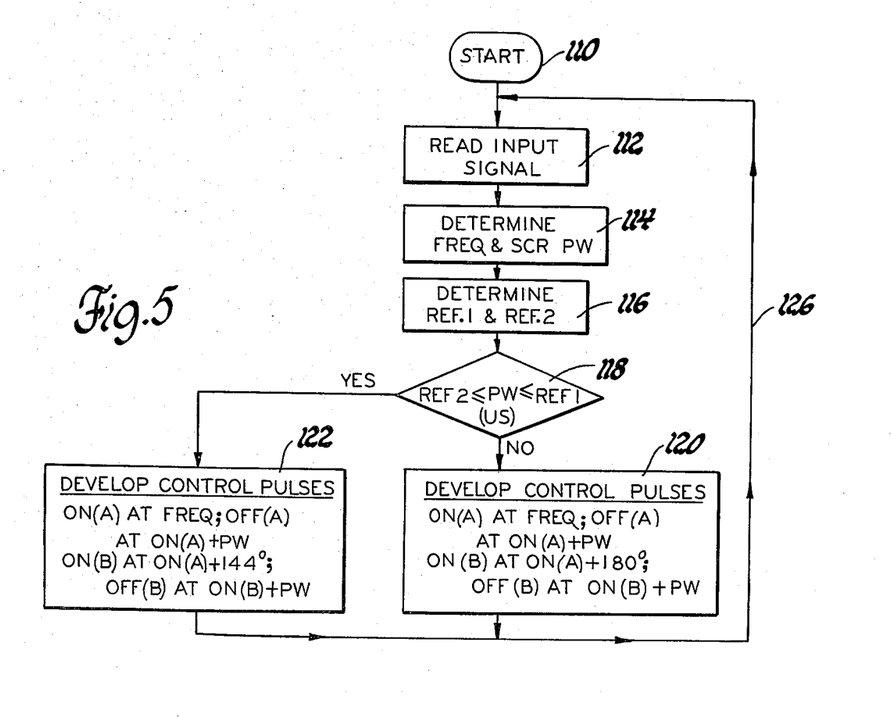
FIG. 5 is a flow diagram for a programmed microprocessor implementation of this invention as applied to a two-phase chopper.

Referring now more particularly to FIG. 5, reference numeral 110 designates a series of instructions to be executed whenever power is initially applied to the control system. It will be appreciated that the functions performed by such instructions include, for example, the initializing of input and output registers. Following the execution of the start-up instructions, the control unit reads a value of input signal provided on line 42 as indicated by reference numeral 112, and determines the chopping frequency (1/T) and the SCR conduction periods (PW) required to satisfy the input signal, as indicated by reference numeral 114. It will be appreciated that the program steps designated by reference numerals 112 and 114 thus perform a function similar to that of pulse width generator 82 described in reference to FIG. 4. The values of REF 1 and REF 2 are then determined as indicated by reference numeral 116 since their values are a function of the chopping period T, as indicated in reference to FIG. 4. The program instructions represented by block 118 then perform the function of window comparator 80 by establishing a deadband of conduction periods between reference values REF 1 and REF 2. If the SCR conduction period (PW) is not within the deadband, turn-on pulses for Phase B are developed 180° after the Phase A turn-on pulses, as indicated at block 120. If, on the other hand, the conduction period (PW) falls within the deadband, the turn-on pulses for Phase B are developed 144° after the Phase A turn-on pulses as indicated at block 122. In either case, the turn-off pulses for Phases A and B are developed in time relation with the respective turn-on pulses according to the determined conduction period PW. Further description of such program instructions is deemed to be unnecessary since such instructions would be apparent to one skilled in the art of computer programming. The control pulses so developed may be applied to the appropriate SCR's with an output driver device such as the MC 6820 Peripheral Interface Adapter, manufactured by Motorola Semiconductor Products, Inc. With the exception of the start-up instructions 110, the above described program instructions are repeatedly executed as designated by return line 126.

Although this invention has been illustrated with respect to a two-phase SCR chopper, it will be appreciated that the invention equally applies to SCR choppers having more than two phases. In the two-phase chopper, the turn-on of Phase A is fixed and the turn-on of Phase B is adjusted with respect to Phase A to avoid commutation failures. In a three-phase chopper, the turn-on of Phase A is fixed and the turn-on of Phases B and C are adjusted with respect to Phase A to avoid commutation failures. Thus, for any multiple phase chopper, one phase (Phase A, for example) is controlled as the master and the remaining phases are adjusted with respect to the master. Obviously, the phase relationships among the various SCR phases vary as a function of the number of phases. In a three-phase SCR chopper, for example, the normal phase relationship between successively energized phases is 120°. That is, for a three-phase SCR chopper, 120° phase relationship results in minimization of battery current ripple content. The modified phase relationship for such a system would be approximately 84° (120° − 36°), based on a 100 uS commutation network charge time.

In order to more clearly illustrate how the chopper control system of this invention may be applied to choppers of more than two phases, FIGS. 6–11 depict a three-phase chopper and exemplary control pulse waveforms at duty cycles near conduction period crossover.

Figure 6:
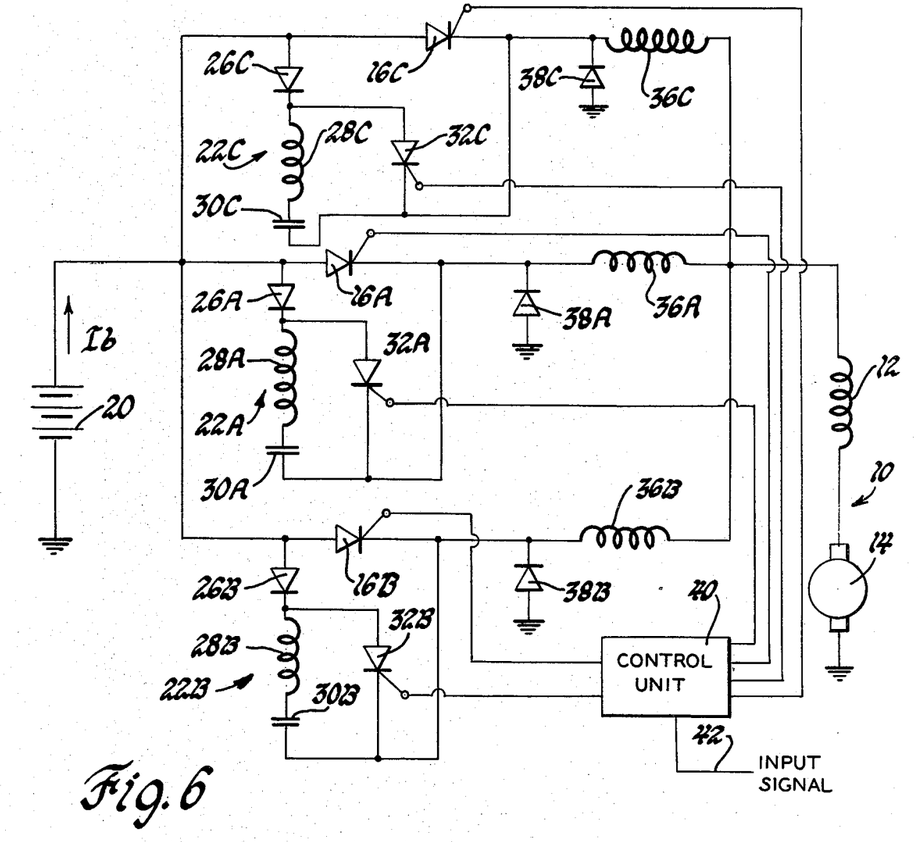
FIG. 6 is a schematic illustration of a three-phase chopper and the control unit of this invention.

FIG. 6 depicts a three-phase chopper of the same type as the two-phase chopper depicted in FIG. 1. Extending the numbering convention used in FIG. 1, the circuit elements in FIG. 6 that are associated with the third or C phase are designated with corresponding numerals followed by the letter C. As with Phases A and B, control unit 40 applies turn-on pulses to the gate terminal of SCR 16C and turn-off pulses to the gate terminal of SCR 32C. The operation of the Phase C circuit elements need not be explained since their operation is identical to that of the Phase A and B circuit elements described in reference to FIG. 1.

Figure 7:
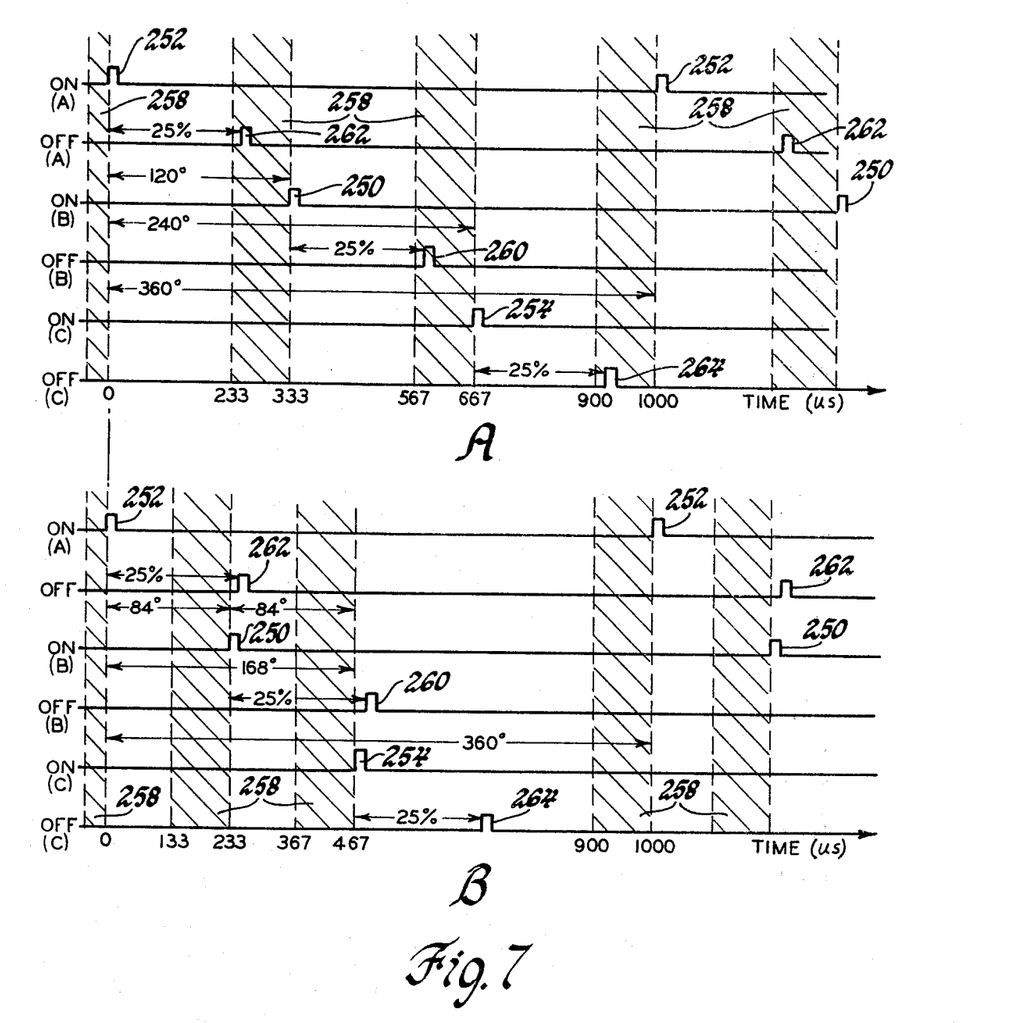
FIG. 7, graphs A and B, are timing diagrams illustrating the operation of the three-phase chopper shown in FIG. 6 at a load point approaching a first conduction period crossover. Graph A illustrates conventional chopper control with timing pulses in the commutation failure region and Graph B illustrates how the chopper control circuit of this invention avoids commutation failure by modifying the SCR phase relationships.

Referring now to FIG. 7, Graphs A and B depict the turn-on and turn-off pulses for the three-phase chopper shown in FIG. 6 for a 25 percent duty cycle or a phase conduction period of 250 uS. Graph A depicts chopper operation at the normal phase relationship while Graph B depicts phase shifted chopper operation. As stated earlier, the normal or balanced phase relationship between successively energized phases for a three-phase chopper is 120°. Accordingly, the Phase B turn-on pulses 250 are spaced 120° from the Phase A turn-on pulses 252, and the Phase C turn-on pulses 254 are spaced 120° from the Phase B turn-on pulses 250. The dead zone 258 preceding each turn-on pulse 250, 252, or 254 is approximately 100 micro-seconds in duration as with the two-phase configuration. It will thus be seen that the portion of the chopper period occupied by dead zones 258 increases as the number of chopper phases increases.

It will be seen in Graph A that a 25 percent duty cycle and normal or balanced phase relationship, all turn-off pulses 260, 262, and 264 fall within dead zones 258. As earlier explained, such operation prevents adequate charging of the commutation networks 22A–22C and thereby causes commutation failures. It can also be seen from Graph A that this condition occurs between duty cycles of approximately 23 percent (233 uS conduction periods) and 33 percent (333 uS conduction periods).

In Graph B of FIG. 7, the chopper duty cycle is maintained at 25 percent, but the Phase B and Phase C turn-on pulses 250 and 254 have been shifted with respect to Phase A turn-on pulses 252 in a manner to prevent the occurrence of a turn-off pulse within a dead zone 258. Thus, the Phase B turn-on pulses 250 are advanced 100 uS or 36° so that the phase separation between the Phase A and Phase B turn-on pulses 252 and 250 is 84° (120° − 36°). The Phase C turn-on pulses 254 are advanced 200 uS or 72° so that the phase relationship between the Phase B and Phase C turn-on pulses 250 and 254 is also 84°. The phase relationship between the Phase A and Phase C turn-on pulses 252 and 254 is 168° (240° − 72°, or 2 × 84°). As a result, commutation failure due to inadequate commutation network charging is avoided. When the duty cycle is increased above 33 percent, turn-on pulses no longer occur in dead zones 258 with normal phase relationship.

Figure 8:
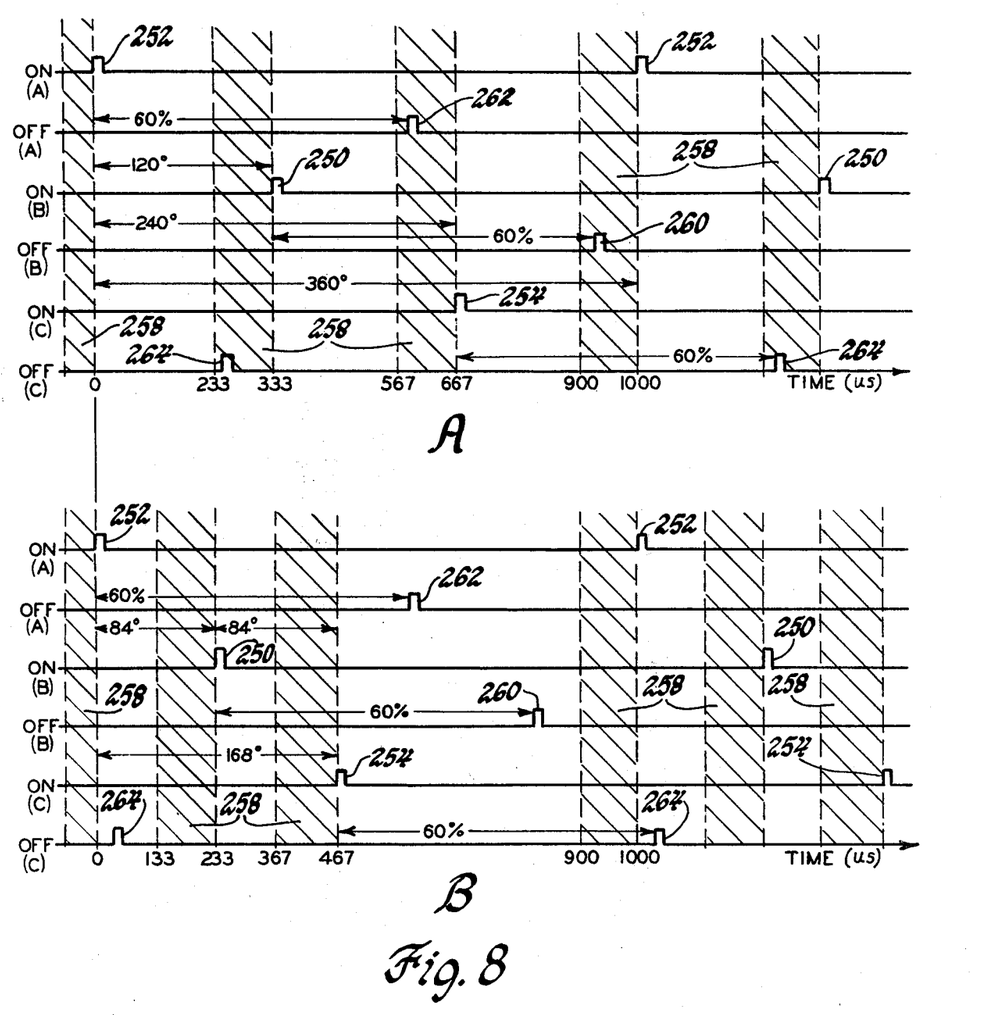
FIG. 8, Graphs A and B, are timing diagrams illustrating the operation of the three-phase chopper shown in FIG. 6 at a load point approaching a second conduction period crossover. Graph A illustrates conventional chopper control with timing pulses in the commutation failure region and Graph B illustrates how the chopper controls circuit of this invention avoids commutation failure by modifying the SCR phase relationships.

Referring now to FIG. 8, Graphs A and B depict chopper turn-on and turn-off pulses for chopper operation at approximately 60 percent duty cycle or a phase conduction period of 600 uS. Graph A depicts chopper operation under normal or balanced phase relationship, while Graph B depicts chopper operation under shifted phase relationship. Corresponding control pulses in FIG. 8 are identified by the same reference numerals used in FIG. 7.

Referring to Graph A, it will be seen that at 60 percent duty cycle and normal or balanced phase relationship, the phase turn-off pulses 260, 262 and 264 each fall within a dead zone 258. It will also be seen with reference to Graph A that this condition occurs between duty cycles of approximately 57 percent (567 uS conduction periods) and 67 percent (667 uS conduction periods).

In Graph B of FIG. 8, the chopper duty cycle is maintained at 60 percent, but the Phase B and Phase C turn-on pulses 250 and 254 have been shifted with respect to Phase A turn-on pulses 252 to avoid a commutation failure. As with the 25 percent duty cycle, the Phase B turn-on pulses 250 are advanced 36° or 100 uS so that the Phase A and B turn-on pulses 252 and 250 are separated by 84°; and the Phase C turn-on pulses are advanced 72° or 200 uS so that the Phase B and C turn-on pulses 250 and 254 are also separated by 84°. As in FIG. 7, the Phase A and Phase C turn-on pulses 252 and 254 are separated by 168°. It will thus be seen in reference to Graph B of FIG. 8 that such phase shifting prevents the occurrence of a turn-off pulse 260, 262, or 264 within a dead zone 258, preventing commutation failure due to insufficient commutation network charging.

When the chopper duty cycle is increased above approximately 67 percent for a phase conduction period of 667 uS (240°) or longer, turn-off pulses no longer occur in dead zones 258 with normal phase relationship.

Figure 9:
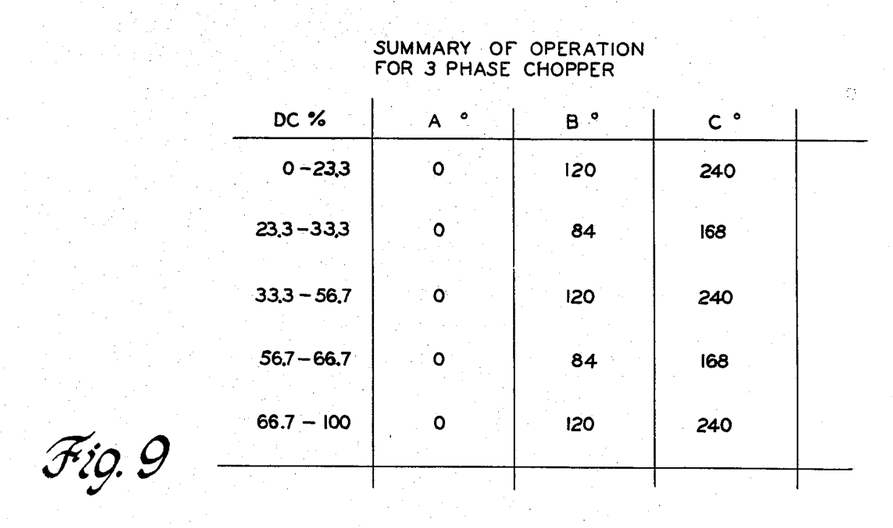
FIG. 9 is a table summarizing the phase relationships of a three-phase chopper for various duty cycles according to the teachings of this invention.

FIG. 9 illustrates the phase control of a three-phase chopper for various duty cycles according to the above stated rules. Thus, the normal or balanced phase relationship wherein the phase separation between successively energized phases is 120° is maintained for chopper duty cycles (1) up to 23 percent, (2) between 33 percent and 57 percent, and (3) above 67 percent. The modified phase relationship wherein the phase separation between successively energized phases is 84° is maintained for chopper duty cycles (1) between 23 percent and 33 percent, and (2) between 57 percent and 67 percent.

Figure 10:
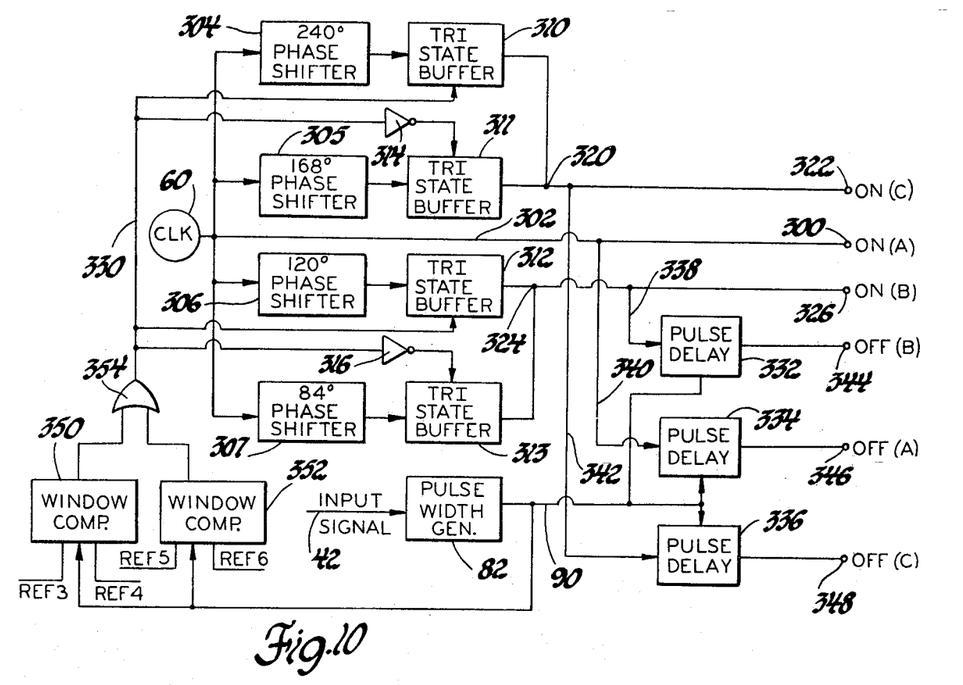
FIG. 10 is a block diagram for a control circuit implementation of this invention as applied to a three-phase chopper.

FIG. 10 is a block diagram, analogous to the block diagram depicted in FIG. 4 of a discrete circuit implementation of this invention. As in FIG. 4, reference numeral 60 designates a clock for producing a train of digital pulses at a frequency of 1 kHz. The pulses from clock 60 form turn-on pulses for Phase A and are applied directly to output terminal 300 via line 302. The output of clock 60 is also applied as in input to 240° phase shifter 304, 168° phase shifter 305, 120° phase shifter 306, and 84° phase shifter 307. Phase shifters 304–307 operate analogously to phase shifters 66 and 68 described in reference to FIG. 4. Thus, phase shifter 304 produces an output pulse 240° after a clock pulse from clock 60; phase shifter 305 produces an output pulse 168° after a clock pulse from clock 60; phase shifter 306 produces an output pulse 120° after a clock pulse from clock 60; and phase shifter 307 produces an output pulse 84° after a clock pulse from clock 60.

The outputs of phase shifters 304 and 305 are connected as inputs to tristate buffers 310 and 311, and the outputs of phase shifters 306 and 307 are connected as inputs to tristate buffers 312 and 313. The outputs of buffers 310 and 311 are connected together at terminal 320 which is connected to output terminal 322 for supplying turn-on pulses to Phase C. Similarly, the outputs of tristate buffers 312 and 313 are connected together at terminal 324 which is connected to output terminal 326 for applying turn-on pulses to Phase B.

Buffers 310 and 311, as well as buffers 312 and 313, are alternately enabled according to the voltage potential on line 330. If the voltage on line 330 is at a digital logic one level, buffer 310 is enabled to pass pulses from 240° phase shifter 304 to output terminal 322, and buffer 312 is enabled to pass pulses from 120° phase shifter 306 to output terminal 326. If the voltage potential on line 330 is at a digital logic zero level, buffer 311 is enabled through inverter 314 to apply pulses from 168° phase shifter 305 to output terminal 322, and buffer 313 is enabled through inverter 316 to pass pulses from 84° phase shifter 307 to output terminal 326. The voltage on line 330 is generated by window comparators 350 and 352 and OR gate 354 as will later be described.

As in FIG. 4, an input signal on line 42 is applied to digital pulse width generator 82 which develops a digital number on line 90 indicative of a phase conduction period for satisfying the input signal. The output of pulse width generator 82 is periodically applied via line 90 as an input to pulse delay units 332, 334, and 336. Pulse delay unit 332 receives ON (B) pulses via line 338, pulse delay unit 334 receives ON (A) pulses via line 340, and pulse delay unit 336 receives ON (C) pulses via line 342. As in FIG. 4, pulse delay units 332, 334 and 336 may be counters which store the digital pulse width number of line 90 and decrement that number at a predetermined clock rate in response to the receipt of a respective turn-on pulse to produce an output pulse at terminals 344, 346 and 348, respectively, delayed in time from the receipt of the respective turn-on pulse according to the magnitude of the pulse width number. It will thus be seen that the conduction periods of Phases A, B and C are equal in duration and determined by pulse width generator 82.

The output of pulse width generator 82 is also applied as an input to window comparators 350 and 352. Window comparators 350 and 352 contain circuit elements analogous to those comprising window comparator 80 in FIG. 4 and have been shown as simple blocks in order to simplify the drawings. As with window comparator 80 in FIG. 4, window comparators 350 and 352 each operate to compare the output of pulse width generator 82 with first and second reference values indicative of phase conduction periods that define the dead zones 258 preceding the turn-on pulses.

Window comparator 350 detects phase conduction periods or pulse widths such as shown in FIG. 7 and corresponding to duty cycles between 23 percent (REF 3) and 33 percent (REF 4). For a three-phase chopper having a period T, and requiring TC seconds to charge a commutation network, REF 4=T/3, and REF 3=(T/3)−TC. When the output of pulse width generator 82 falls between reference values REF 3 and REF 4, the output of window comparator 350 assumes a logic zero voltage level.

Window comparator 352 detects phase conduction periods or pulse widths such as shown in FIG. 8 and corresponding to duty cycles from 57 percent (REF 5) to 67 percent (REF 6). For a three-phase chopper, REF 6=2T/3, and REF5=(2T/3)−TC. When the output of pulse width generator 82 falls between REF 5 and REF 6, the output of window comparator 352 assumes a logic zero voltage level.

The outputs of window comparators 350 and 352 are applied as inputs to OR gate 354, the output of which determines the voltage potential on line 330 for controlling the phase relationship of the turn-on pulses. Thus, the voltage on line 330 is at a logic zero voltage level to engage the modified or unbalanced phase relationship if the output of pulse width generator 82 falls between REF 3 and REF 4 or between REF 5 and REF 6. Otherwise, the voltage on line 330 is at a logic one voltage level, engaging the normal or balanced phase relationship.

Figure 11:
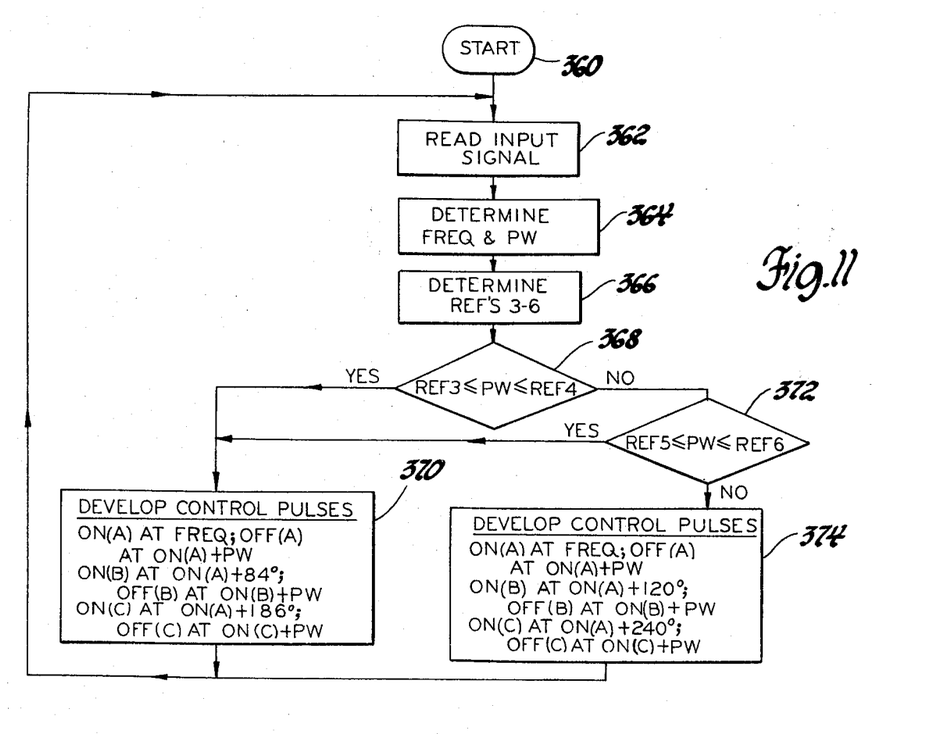
FIG. 11 is a flow diagram for a programmed microprocessor implementation of this invention as applied to a three-phase chopper.

FIG. 11 is a flow diagram for a programmed microprocessor implementation of the invention as applied to a three-phase chopper such as the one shown in FIG. 6. Analogously to the flow diagram for the two-phase chopper in FIG. 5, instructions 360 are executed at start up and initialize the various registers; instructions 362 cause the input signal on line 42 to be read; and instructions 364 determine the chopping frequency (1/T) and the phase conduction period (PW) required to satisfy the input signal. The instructions designated by reference numeral 366 determine the values of REF 3–REF 6 according to the expressions given in reference to FIG. 10. The instructions designated by reference numeral 368 then detect if the last determined pulse width PW falls between reference values REF 3 and REF 4. If so, the turn-on and turn-off chopper control pulses are developed according to the instructions designated by reference numeral 370 to develop a modified phase relationship. If the pulse width PW does not fall between reference values REF 3 and REF 4, the instructions designated by reference numeral 372 detect whether the pulse width PW falls between the reference values REF 5 and REF 6. If so, the chopper control pulses are developed according to the modified phase relationship as indicated at the block designated by reference numeral 370. If the pulse width PW does not fall between REF 5 and REF 6, the chopper control pulses are developed according to the instructions designated by reference numeral 374 to develop a normal or balanced phase relationship. As stated in reference to FIG. 5, further description of the program instructions is deemed to be unnecessary since such instructions would be apparent to one skilled in the art of computer programming in view of the above descriptions.

As indicated earlier, the chopper phase control system of this invention may be extended to choppers having four or more phases if desired. For choppers of the type described herein, a nine-phase chopper is considered to be the limit since the dead zones 258 would occupy the entire chopper period with a ten-phase configuration. For an N-phase chopper, there are N-1 conduction period crossovers per cycle, and such crossovers occur when the phase conduction period is an integral multiple of 360/N degrees. Thus, in a four-phase chopper, there are three conduction period crossovers per cycle and such crossovers occur at phase conduction periods of 90°, 180° and 270°.

The control circuit and programmed microprocessor embodiments required to implement the invention for a chopper having four or more phases is merely a logical extension of that required for the two and three-phase choppers, and should be apparent in view of the circuitry depicted in FIGS. 4 and 10 and the flow diagrams depicted in FIGS. 5 and 11.

From the foregoing description, it will be apparent that the multiple current paths and corresponding phase currents of a chopper embodying the invention may be viewed as comprising a master current path and associated phase current and one or more slave current paths and associated phase currents. Thus, as to the two-phase embodiment of the invention illustrated in FIGS. 1-5, current Phase A and the path through which it flows may be designated as the master while current Phase B and the path through which it flows is designated as a slave. With respect to the three-phase embodiment of the invention illustrated in FIGS. 6-11, current Phase A and its related path may be considered as the master while current Phase B and C and their related paths are considered as slaves.

It will be appreciated that this invention has been described in reference to specific embodiments and that various modifications may occur to one skilled in the art without departing from the scope of this invention as set forth in the appended claims.

We claim:

1. A chopper drive mechanism for an electric motor of the type wherein current from a common source is applied through first and second paths in like duration pulses at a common repetition rate, wherein means is normally effective to initiate current flow in said second path in predetermined relation with respect to the initiation of current flow in said first path, and wherein the current turn-off in each path must be either after or more than a predetermined time before the current turn-on of the other path, the improvement comprising:
   additional means responsive to the time spacing of said pulses and their duration effective to identify when said current flow would be initiated in the second path less than a predetermined time after the current turn-off in said first path; and
   phase shift elements activated by said additional means to advance the initiation of current flow in the second path to a time prior to turn-off of the current flow in the first path.

2. A chopper mechanism of the type wherein current from a common source is sequentially applied to a load through at least two separate current paths in like duration pulses and at a common repetition rate and wherein the current turn-off in each path must be either after or more than a predetermined time prior to the current turn-on in the other path to ensure reliable current commutation, the improvement comprising:
   means normally effective in response to the initiation of current flow in one path to initiate current flow in the said other path in predetermined phase relationship therewith;
   additional means responsive to the time spacing of said pulses and their duration effective to identify when the current turn-off in either path would occur within said predetermined time; and
   phase-shift elements for said other path activated by said additional means to advance the initiation of current flow in said other path with respect to the initiation of current flow in said one path by an amount at least as great as said predetermined time to prevent a current turn-off within said predetermined time, whereby reliable current commutation is ensured.

3. A multiple phase chopper for controlling the application of power from a source of direct voltage to an electrical load, comprising in combination:
   a plurality of switching elements defining an equal number of chopper phases and effective when biased to a conductive state to connect said source to said load, said switching elements being of the type that may be biased to a conductive state by applying a turn-on pulse to a control terminal thereof and that may be biased to a nonconductive state by reversing the voltage potential thereacross;
   a commutation network for each of said chopper phases, each network being connected in a manner to receive charging current from said source when the respective switching element is nonconductive and being effective upon receipt of a turn-off pulse to reverse the voltage potential across said switching element to bias the same to a nonconductive state;
   means for developing turn-on pulses for the control terminals of said switching elements in sequence, said turn-on pulses being separated according to a predetermined phase relationship;
   means responsive to an input signal value indicative of a desired load output level for generating turn-off pulses for said commutation networks, the turn-off pulses for each chopper phase being spaced in time relative to the respective turn-on pulses for such phase so as to define equal conduction periods for all chopper phases for achieving said desired load output level;
   means defining a reference time zone preceding each of said turn-on pulses, the duration of said zone being a function of the time required to adequately charge said commutation networks; and
   means effective for input signal values tending to result in the generation of a turn-off pulse within a reference time zone for altering the phase relationship between said turn-on pulses so that no turn-off pulse occurs within a reference time zone, whereby said commutation networks are sufficiently charged to ensure reliable commutation for all input signal values.

4. A multiple phase silicon controlled rectifier chopper for controlling the application of power from a source of direct voltage to an electrical load, comprising in combination:
   a plurality of silicon controlled rectifiers defining an equal number of chopper phases, each of said controlled rectifiers being effective upon receipt of a turn-on pulse to connect said source to said load;
   a commutation network for each of said chopper phases, each network being connected in a manner to receive charging current from said source when the respective controlled rectifier is nonconductive and being effective upon receipt of a turn-off pulse to bias the respective controlled rectifier to a nonconductive state;

means for developing turn-on pulses for said controlled rectifiers in sequence, said turn-on pulses being separated according to a predetermined phase relationship tending to minimize the source current form factor;

means responsive to an input signal value indicative of a desired load output level for generating turn-off pulses for said commutation networks, the turn-off pulses for each chopper phase being spaced in time relative to the respective turn-on pulses for such phase so as to define equal conduction periods for all chopper phases for achieving said desired load output level;

means defining a reference time zone preceding each of said turn-on pulses, the duration of said zone being a function of the time required to adequately charge said commutation networks; and means effective for input signal values tending to result in the generation of a turn-off pulse within a reference time zone for altering the phase relationship between said turn-on pulses so that no turn-off pulse occurs within a reference time zone, whereby said commutation networks are sufficiently charged to ensure reliable commutation for all input signal values.

5. A multiple phase silicon controlled rectifier chopper for controlling the application of power from a source of direct voltage to an electrical load, comprising in combination:

a plurality of silicon controlled rectifiers defining an equal number of chopper phases, each of said controlled rectifiers being effective upon receipt of a turn-on pulse to connect said source to said load;

a commutation network for each of said chopper phases, each network being connected in a manner to receive charging current from said source when the respective controlled rectifier is nonconductive and being effective upon receipt of a turn-off pulse to bias the respective controlled rectifier to a nonconductive state;

means for developing turn-on pulses for said controlled rectifiers in sequence, said turn-on pulses being separated according to a predetermined phase relationship;

means responsive to an input signal value indicative of a desired load output level for generating turn-off pulses for said commutation networks, the turn-off pulses for each chopper phase being spaced in time relative to the respective turn-on pulses for such phase so as to define equal conduction periods for all chopper phases for achieving said desired load output level;

means defining a reference time zone preceding each of said turn-on pulses, the duration of said zone being a function of the time required to adequately charge said commutation networks; and means effective for input signal values tending to result in the generation of a turn-off pulse within a reference time zone for altering the phase relationship between successive turn-on pulses by an amount at least as great as the time required to adequately charge said commutation networks so that no turn-off pulse occurs within a reference time zone, whereby said commutation networks are sufficiently charged to ensure reliable commutation for all input signal values.

6. A multiple phase silicon controlled rectifier chopper for controlling the application of power from a source of direct voltage to an electrical load, comprising in combination:

a plurality of silicon controlled rectifiers defining an equal number of chopper phases, each of said controlled rectifiers being effective upon receipt of a turn-on pulse to connect said source to said load;

a commutation network for each of said chopper phases, each network being connected in a manner to receive charging current from said source when the respective controlled rectifier is nonconductive and being effective upon receipt of a turn-off pulse to bias the respective controlled rectifier to a nonconductive state;

means for developing turn-on pulses for said controlled rectifiers in sequence, said turn-on pulses being separated according to a predetermined phase relationship;

means responsive to an input signal value indicative of a desired load output level for generating turn-off pulses for said commutation networks, the turn-off pulses for each chopper phase being spaced in time relative to the respective turn-on pulses for such phase so as to define equal conduction periods for all chopper phases for achieving said desired load output level;

means defining a reference time zone preceding each of said turn-on pulses, the duration of said zone being a function of the time required to adequately charge said commutation networks; and means effective for input signal values tending to result in the generation of a turn-off pulse within a reference time zone for maintaining the chopper conduction periods chosen to achieve the desired load output level and altering the phase relationship between said turn-on pulses so that no turn-off pulse occurs within a reference time zone, whereby said chopper is commutated reliably and delivers continuous average power from said source to said load throughout the entire range of input signal values.

7. An electric vehicle chopper for controlling the application of power from the storage batteries to a DC traction motor, comprising in combination:

a plurality of silicon controlled rectifiers defining an equal number of chopper phases, each of said controlled rectifiers being effective upon receipt of a turn-on pulse to connect said batteries to said motor;

a commutation network for each of said chopper phases, each network being connected in a manner to receive charging current from said battery when the respective controlled rectifier is nonconductive and being effective upon receipt of a turn-off pulse to bias the respective controlled rectifier to a nonconductive state;

means for developing turn-on pulses for said controlled rectifiers in sequence, said turn-on pulses being separated according to a predetermined phase relationship;

means responsive to an input signal value indicative of a desired load output level for generating turn-off pulses for said commutation networks, the turn-off pulses for each chopper phase being spaced in time relative to the respective turn-on pulses for such phase so as to define equal conduction periods for all chopper phases for achieving said desired load output level;

means defining a reference time zone preceding each of said turn-on pulses, the duration of said zone being a function of the time required to adequately charge said commutation networks; and means effective for input signal values tending to result in the generation of a turn-off pulse within a reference time zone for altering the phase relationship between said turn-on pulses so that no turn-off pulse occurs within a reference time zone, whereby said commutation networks are sufficiently charged to ensure reliable commutation for all input signal values.

8. A chopper mechanism of the type where current from a common source is sequentially applied through a plurality of current paths to a load in current pulses of like duration and common repetition period and where the current turn-off in each path must be either after or more than a predetermined time prior to the current turn-on in any other path to ensure reliable current commutation, the improvement comprising:

means normally effective in response to current turn-on in one of the paths designated as the master path to successively effect current turn-on in the other paths designated as slave paths in a manner to establish a normal time separation between successive current path turn-ons;

detector means responsive to the time separation of the current pulses and their duration effective to identify an unreliable current commutation condition when the current turn-off in any path would occur within the predetermined time prior to the current turn-on in any other path; and means including phase-shift elements in the slave paths activated by the detector means in response to the identification of an unreliable current commutation condition to advance the current turn-on in the slave paths with respect to the current turn-on in the master path so that in a given repetitive cycle, successive current turn-ons are separated by an amount at least as great as the difference between said normal time separation and said predetermined time, to thereby avoid said unreliable current commutation condition.

* * * * *